(12) United States Patent
Jensen

(10) Patent No.: US 7,596,200 B2
(45) Date of Patent: Sep. 29, 2009

(54) METHOD AND APPARATUS FOR REPAIRING A JET PUMP RISER BRACE TO REACTOR VESSEL PAD ATTACHMENT IN A NUCLEAR REACTOR

(75) Inventor: Grant Clark Jensen, Morgan Hill, CA (US)

(73) Assignee: General Electric Company, Schenectady, NY (US)

( * ) Notice: Subject to any disclaimer, the term of this patent is extended or adjusted under 35 U.S.C. 154(b) by 130 days.

(21) Appl. No.: 11/090,063

(22) Filed: Mar. 28, 2005

(65) Prior Publication Data

US 2006/0215801 A1 Sep. 28, 2006

(51) Int. Cl.
*G21C 15/00* (2006.01)

(52) U.S. Cl. .............. 376/372; 376/461; 376/303; 403/374.3; 248/245

(58) Field of Classification Search .......... 403/105, 403/373, 374.01, 11, 13, 14, 374.3; 376/282, 376/372, 461, 303; 285/305, 309; 248/245
See application file for complete search history.

(56) References Cited

U.S. PATENT DOCUMENTS

| | | | | |
|---|---|---|---|---|
| H000906 H | * | 4/1991 | Baggett et al. | 403/409.1 |
| 5,752,807 A | * | 5/1998 | Erbes | 417/63 |
| 5,947,529 A | * | 9/1999 | Jensen | 285/123.6 |
| 6,099,199 A | * | 8/2000 | Mullenberg | 403/370 |
| 6,131,962 A | * | 10/2000 | Jensen et al. | 282/337 |
| 6,375,230 B1 | * | 4/2002 | Jensen et al. | 285/104 |
| 6,456,682 B1 | * | 9/2002 | Jensen | 376/282 |
| 6,647,083 B1 | * | 11/2003 | Jensen | 376/286 |
| 6,857,814 B2 | * | 2/2005 | Jensen | 403/374.3 |
| 6,872,027 B2 | * | 3/2005 | Ledinham | 403/400 |
| 7,185,798 B2 | * | 3/2007 | Butler | 228/44.5 |

FOREIGN PATENT DOCUMENTS

JP 2006071638 A * 3/2006

* cited by examiner

*Primary Examiner*—Rick Palabrica
(74) *Attorney, Agent, or Firm*—Harness, Dickey & Pierce, P.L.C.

(57) ABSTRACT

A clamp apparatus is provided which is designed to structurally replace a weld that attaches a riser brace assembly to a reactor pressure vessel wall, and a method for repairing the riser brace assembly. The riser brace assembly is designed to support a jet pump in the reactor pressure vessel. The riser brace assembly may include upper and lower riser brace leaves connected to a reactor pressure vessel pad on the wall. The clamp apparatus may include a first clamp component including a central extension portion, and a second clamp component including a slot portion. The central extension and slot portions may be engaged to provide alignment between the first and second clamp components between the upper and lower riser brace leaves of the riser brace assembly.

14 Claims, 13 Drawing Sheets

CONVENTIONAL ART

METHOD AND APPARATUS FOR REPAIRING A JET PUMP RISER BRACE TO REACTOR VESSEL PAD ATTACHMENT IN A NUCLEAR REACTOR

BACKGROUND OF THE INVENTION

1. Field of the Invention

This present invention relates generally to a method and apparatus for repairing a riser brace assembly that lends lateral support to a jet pump of a boiling water reactor.

2. Description of the Related Art

A reactor pressure vessel (RPV) of a boiling water reactor (BWR) typically has a generally cylindrical shape and is closed at both ends, e.g., by a bottom head and a removable top head. A top guide typically is spaced above a core plate within the RPV. A core shroud, or shroud, typically surrounds the core and is supported by a shroud support structure. Particularly, the shroud has a generally cylindrical shape and surrounds both the core plate and the top guide. There is a space or annulus located between the cylindrical reactor pressure vessel and the cylindrically-shaped shroud.

FIG. 1 is a schematic, partial cross sectional view, with parts cut away, of a reactor pressure vessel (RPV) 20 for a boiling water reactor. RPV 20 has a generally cylindrical-shape and is closed at one end by a bottom head and at its other end by removable top head (not shown). A top guide (not shown) is situated above a core plate 22 within RPV 20. A shroud 24 surrounds core plate 22 and is supported by a shroud support structure 26. A downcomer annulus 28 is formed between shroud 24 and sidewall 30 of RPV 20.

An annulet nozzle 32 extends through sidewall 30 of RPV 20 and is coupled to a jet pump assembly 34, hereafter "jet pump 34". Jet pump 34 may include a thermal sleeve 36 which extends through nozzle 32, a lower elbow (only partially visible in FIG. 1), and a riser pipe 38. Thermal sleeve 36 is secured at a first end (not shown) to a second end of the lower elbow. The first end of thermal sleeve 36 is welded to the second end of the lower elbow. A first end of the lower elbow similarly secured, or welded, to one end of riser pipe 38. Riser pipe 38 extends between and substantially parallel to shroud 24 and sidewall 30.

A jet pump riser brace assembly 40 (hereafter "riser brace assembly 40") stabilizes riser pipe 38 within RPV 20. The riser brace assembly 40 may be fabricated of type 304 stainless steel which, after periods of use, may be susceptible to cracking at welded joints. The riser brace assembly 40 is fixedly connected between shroud 24 and sidewall 30, and primarily provides lateral support to the jet pump 34 via riser pipe 38, as shown in FIG. 1. Additionally the riser brace assembly 40 is designed to accommodate for differential thermal expansion resulting from reactor start-up and heatup, and flow induced vibration that is incumbent in the reactor water recirculation system (not shown).

FIG. 2 illustrates the riser brace assembly 40 of FIG. 1 in further detail. In FIG. 2, the riser pipe 38 has been removed for reasons of clarity. Riser brace assembly 40 primarily provides lateral support to the jet pump 34 via riser pipe 38, and includes a riser brace yoke 49 that is welded to the riser pipe 38. Riser brace yoke 49 may typically be a plate that is between about 3-4 inches thick. Riser brace yoke 49 is connected via welds to two pairs of riser brace leaves, an upper riser brace leaf (shown as 41a, 41b) and a lower riser brace leaf (shown as 42a and 42b). Leaves 41a/b and 42a/b are welded to a reactor vessel riser brace pad 130 (hereafter "reactor vessel pad 130") which in turn is affixed to RPV sidewall 30. In an example, the reactor vessel pad 130 may be embodied as a weld buildup on the surface of RPV sidewall 30.

Thus, riser brace assembly 40 includes four riser brace leaves 41,a, 42a, 41b and 42b, which are welded at one end, shown as riser brace leaf attachment welds 143-146, to reactor vessel pads 130 provided on the RPV sidewall 30. Welds 143-146 may be commonly referred to as "RB-1" welds, for example. In the event that the structural integrity of the welds 143-146 joining the riser brace assembly 40 and the pads 130 should become degraded, a means of reinforcing or replacing the subject weld 143-146 is desired.

For example, weld failure due to vibration fatigue, and/or weld cracking due to intergranular stress corrosion cracking (IGSCC) could cause one of the welds 143-146 to fail. Separation of the riser brace assembly 40 near this weld area could adversely impact safety in BWRs. Potentially, should a riser brace assembly 40 break away from RPV 20 (e.g., at RPV sidewall 30), the riser pipe 38 becomes unstabilized, and the jet pump 34 could be adversely affected. If just one jet pump 34 is damaged, a substantial amount of piping must either be replaced or repaired.

In recent years, riser brace clamps have been fabricated and installed in a domestic BWR. These clamps are designed to provide structural support between the riser brace and an adjoining "block" structure in the riser brace assemblies of a select few BWRs. Such an exemplary clamp apparatus is described in U.S. Pat. No. 6,857,814 to the inventor, entitled "METHOD AND APPARATUS FOR REPAIRING A RISER BRACE IN NUCLEAR REACTOR", the relevant portions of which are incorporated in their entirety by reference herein.

SUMMARY OF THE INVENTION

An exemplary embodiment of the present invention is directed to a clamp apparatus for repairing a riser brace assembly in a nuclear reactor. The riser brace assembly may include upper and lower riser brace leaves, which are connected to a reactor pressure vessel pad on a wall of the nuclear reactor. The clamp apparatus may include a first clamp component including a central extension portion, and a second clamp component including a slot portion. The central extension and slot portions may be engaged to provide alignment between the first and second clamp components between the upper and lower riser brace leaves of the riser brace assembly.

Another exemplary embodiment of the present invention is directed to a method of installing a clamp apparatus at an interface of a reactor vessel pad on a wall of a nuclear reactor with a riser brace assembly supporting a jet pump in a nuclear reactor. The riser brace assembly may include upper and lower riser brace leaves. In the method, a central extension portion of a first clamp component may be engaged within a slot portion of a second clamp component to provide alignment between the first and second clamp components between the upper and lower riser brace leaves. Clamping forces may be applied to secure the first and second clamp components to the reactor vessel pad and to one of the upper and lower riser brace leaves. A first plate may be attached to the first and second clamp components so as to bear on a top surface of the upper riser brace leaf, and a second plate may be attached to the first and second clamp components so as to bear on an underside surface of the first and second clamp components.

Another exemplary embodiment of the present invention is directed to a clamp apparatus for structurally replacing a defective weld used to attach one of an upper and a lower riser brace leaf of a riser brace assembly to a reactor vessel pad in a nuclear reactor. The clamp apparatus may include a first clamp component including a central extension portion, and a second clamp component including a slot portion, where the central extension portion may be engaged within the slot portion. The first and second clamp components are fixedly secured to only one of the upper and lower riser brace leaves to replace the defective weld.

BRIEF DESCRIPTION OF THE DRAWINGS

The exemplary embodiments of the present invention will become more fully understood from the detailed description given herein below and the accompanying drawings, wherein like elements are represented by like reference numerals, which are given by way of illustration only and thus are not limitative of the present invention.

DETAILED DESCRIPTION OF THE EXEMPLARY EMBODIMENTS

Figure 3:
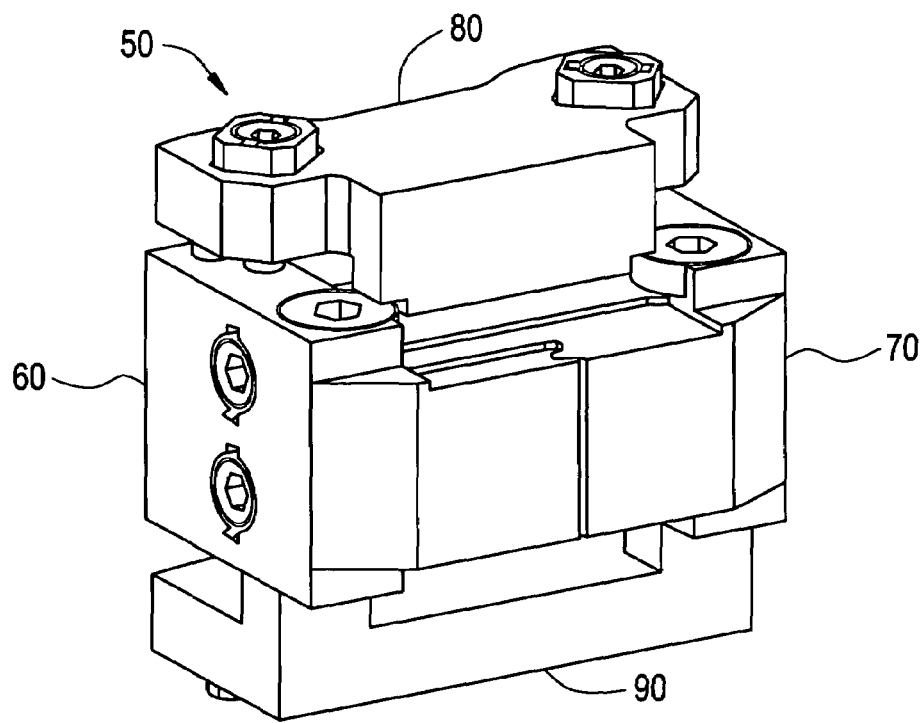
FIG. 3 is an isometric view of a clamp apparatus in accordance with an exemplary embodiment of the present invention.
Figure 4:
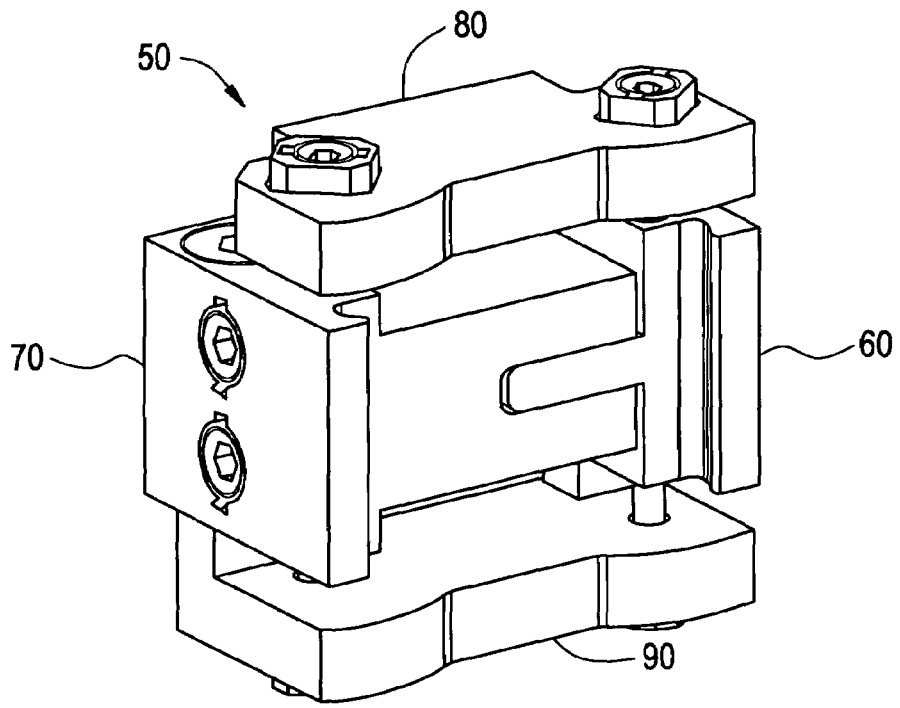
FIG. 4 is another isometric view of the clamp apparatus in accordance with an exemplary embodiment of the present invention.

FIGS. 3 and 4 are isometric views of a clamp apparatus in accordance with an exemplary embodiment of the present invention. FIG. 3 is a view showing the side of the clamp apparatus which engages a riser brace leaf, and FIG. 4 is a view showing the side of the clamp apparatus 50 which is in contact with reactor vessel pad 130.

Figure 1:
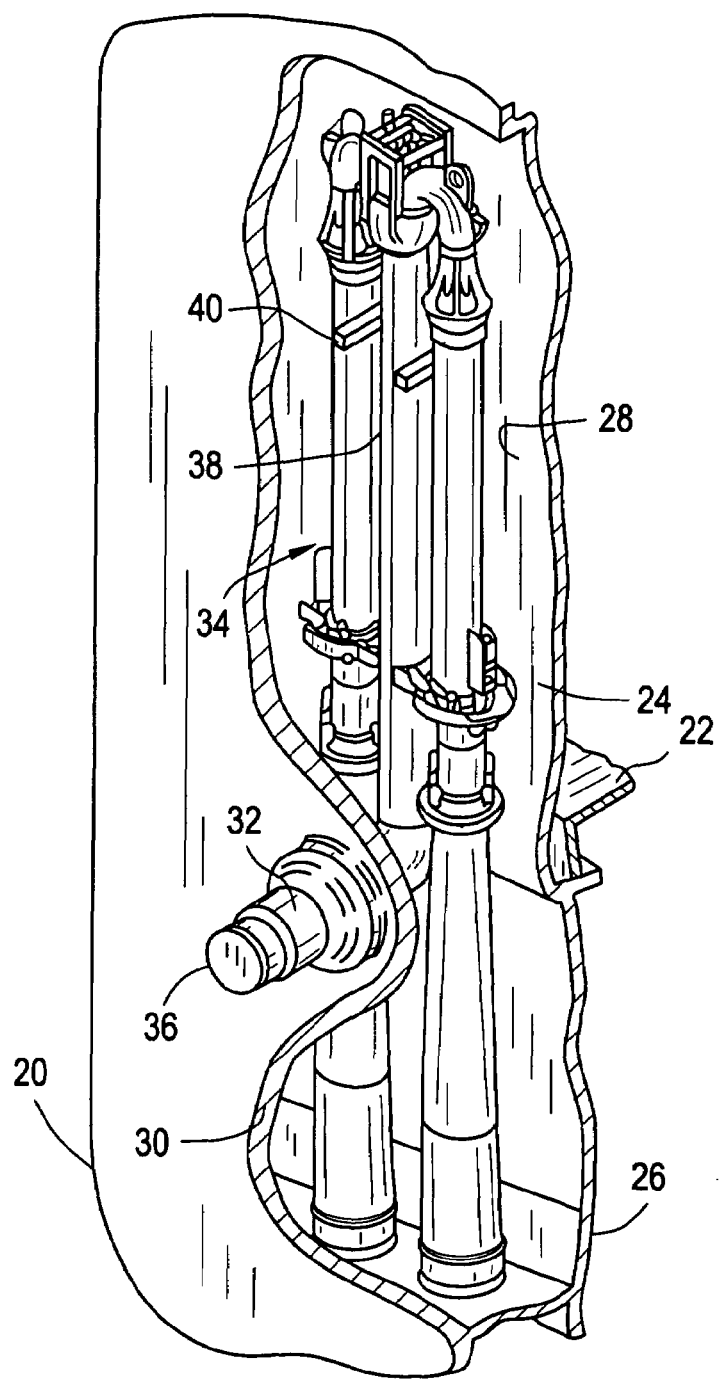
FIG. 1 is a schematic, partial cross-sectional view, with parts cut away, of a reactor pressure vessel of a boiling water nuclear reactor.
Figure 2:
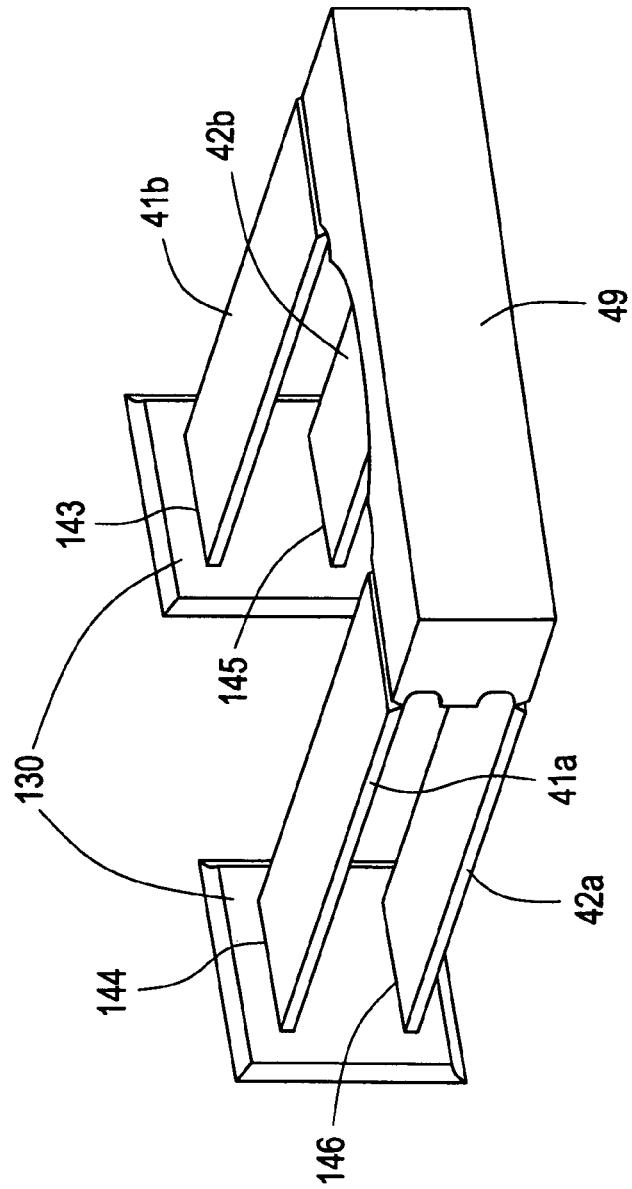
FIG. 2 illustrates an exemplary riser brace assembly of a boiling water reactor.

The riser brace clamp apparatus 50 as shown in FIGS. 3 and 4 may include four primary structural components with associated mechanical fasteners and locking devices. The primary components of the clamp assembly 50 may include an outboard clamp component 60 ('first clamp component'), an inboard clamp component 70 ('second clamp component'), a primary bearing plate 80 ('first plate', and a secondary bearing plate 90 ('second plate'). The riser brace clamp apparatus 50 may be applicable to any one of the four possible reactor weld locations 143-146 as shown in FIG. 2. Similar reactor vessel pads 130 and associated welds 143-146 exist for each jet pump riser brace assembly 40. Accordingly, the clamp apparatus 50 is fixedly secured to only one riser brace leaf so as to structurally replace the corresponding weld at the interface of that least with the reactor vessel pad 130.

Figure 5:
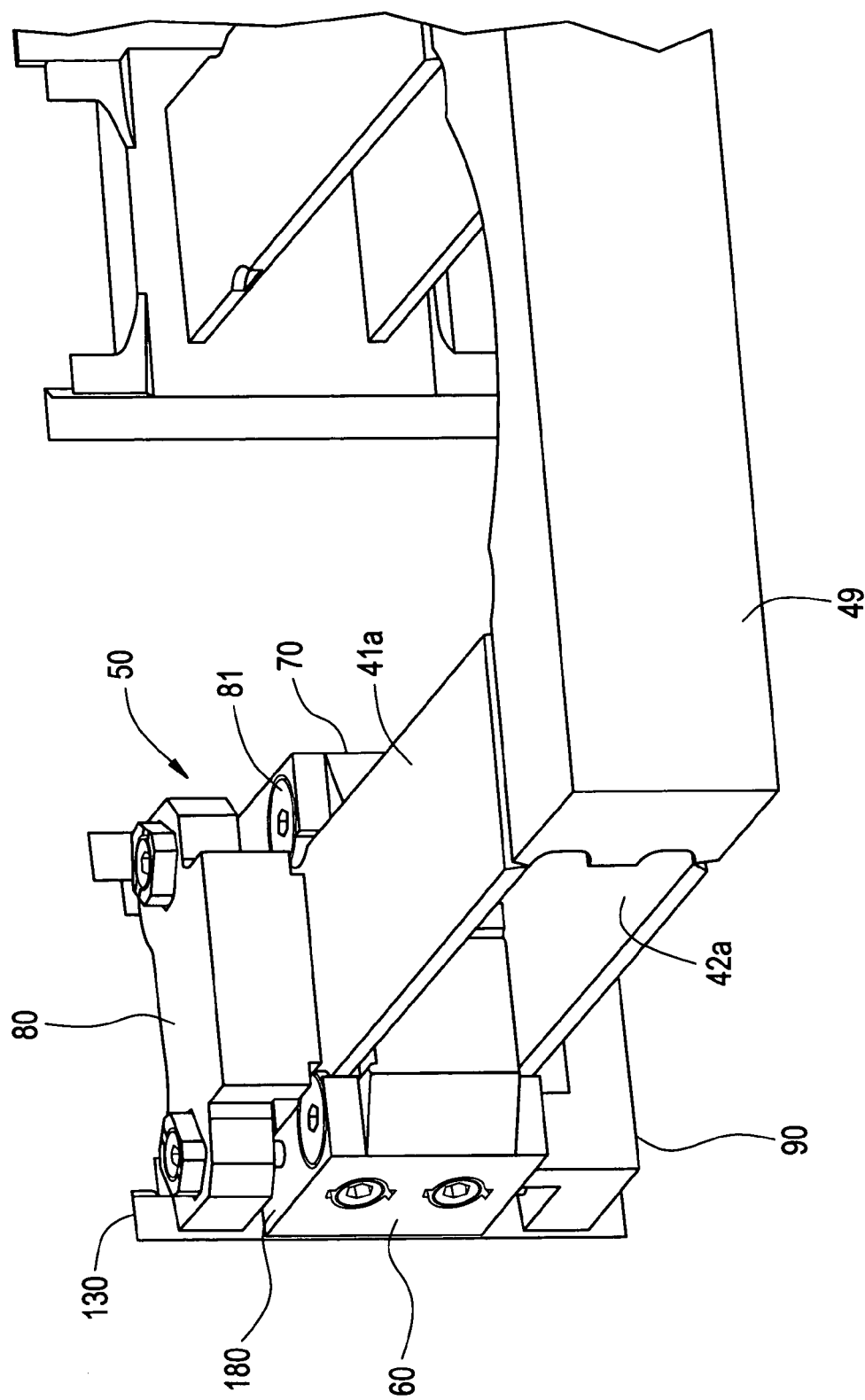
FIG. 5 is an isometric view of the clamp apparatus shown in FIGS. 3 and 4 arranged within a reactor pressure vessel (RPV) so as to engage a weld location at a riser brace leaf to reactor vessel riser brace pad interface, in accordance with an exemplary embodiment of the present invention.

FIG. 5 is a plan view of the clamp apparatus shown in FIGS. 3 and 4 arranged within a reactor pressure vessel such as RPV 20 so as to replace a defective weld at a single riser brace leaf to reactor vessel riser brace pad 130 interface, in accordance with an exemplary embodiment of the present invention. For descriptive purposes, the riser brace clamp apparatus 50 is shown installed at the upper left weld 144 location of leaf 41a in FIG. 5.

Figure 6:
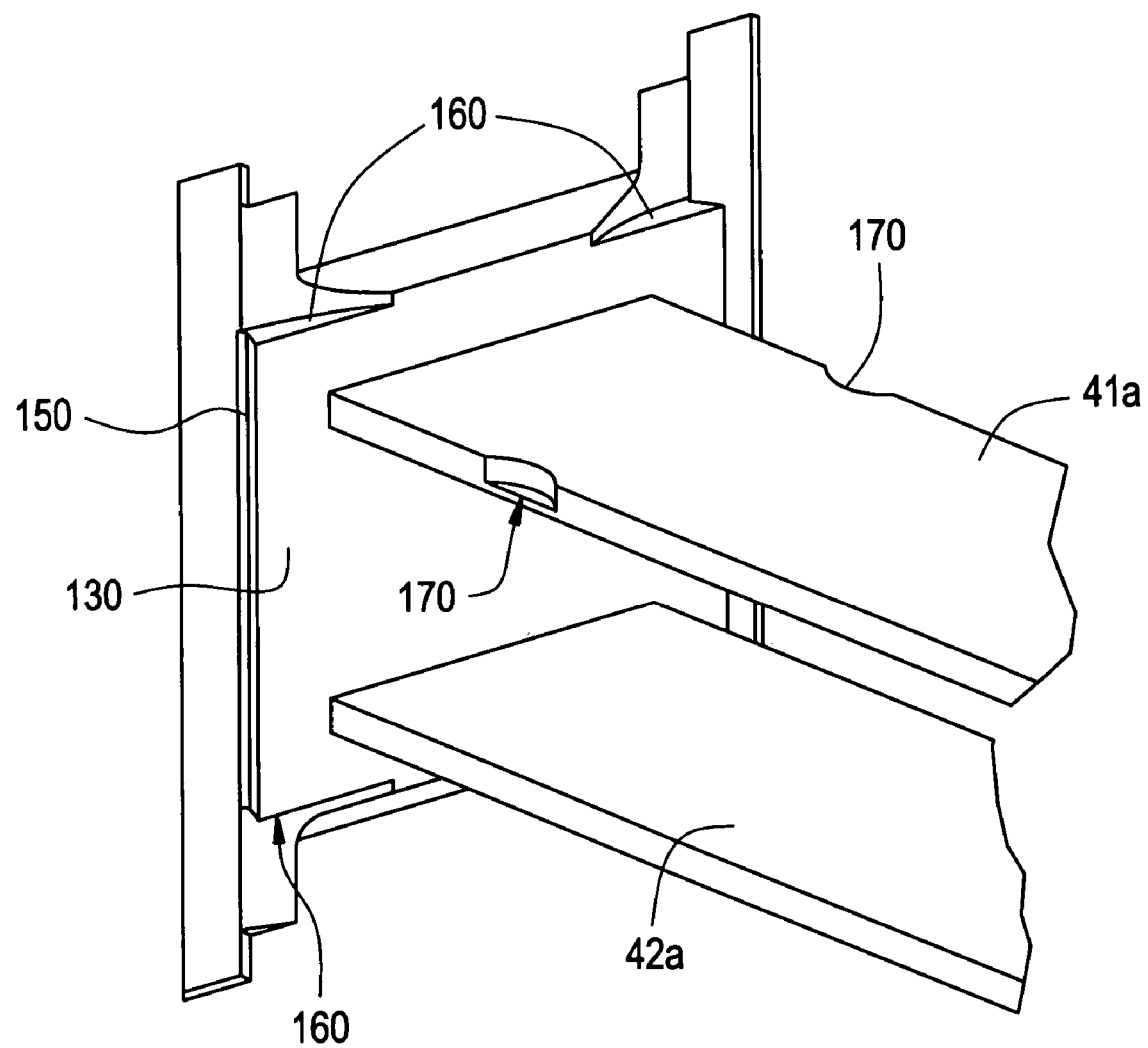
FIG. 6 is an enlarged perspective view illustrating the riser brace leaf to reactor vessel riser brace pad connection to describe machined features for receiving the exemplary clamp apparatus of the present invention.

FIG. 6 is an enlarged perspective view illustrating the riser brace leaf 41a to reactor vessel pad 130 connection to describe machined features for receiving the exemplary clamp apparatus 50 of the present invention. In order to attach to the RPV 20 and thereby transfer mechanical loads from the riser brace leaf 41a to the RPV 20, modifications may be made to the reactor vessel pad 130. These alterations as shown in FIG. 6 may be accomplished by electric discharge machining (EDM), for example, although other known techniques of machining may be employed as is evident to one skilled in the art.

For example, two half-dovetail features 150 may be machined vertically into opposite sides of the reactor vessel pad 130. In addition, four horizontal surfaces 160 may be machined at each of the four corners of the reactor vessel pad 130, as shown in FIG. 6. Additionally, two crescent-shaped features 170 may be provided on a top surface of the riser brace leaf 41a (it being understood that features 150,160 and 170 may be included similarly on other leaf pairs 41/42 of other riser brace assemblies 40.

If the clamp apparatus 50 installation is to be made on a lower riser brace leaf 42a or 42b (at welds 145,146), then the crescent-shaped features 170 may be machined into the bottom surface of the respective leaf 42a or 42b. This follows from the fact that the clamp apparatus 50 would be oriented "up-side down" from the reference orientation shown in FIG. 5.

If the desired clamping location were to be associated with the upper right weld location 143, then the clamp assembly 50 would therefore need to be what is commonly referred to as an "opposite hand" clamp assembly 50. This is necessitated by the curvature of internal surface of RPV 20, identical clamp assembly 50 hardware would be installed on the upper left 41a and lower right 42b riser brace leaves. Likewise, an opposite hand clamp assembly 50 would be installed on the upper right 41b and lower left 42a riser brace leaves.

Figure 7:
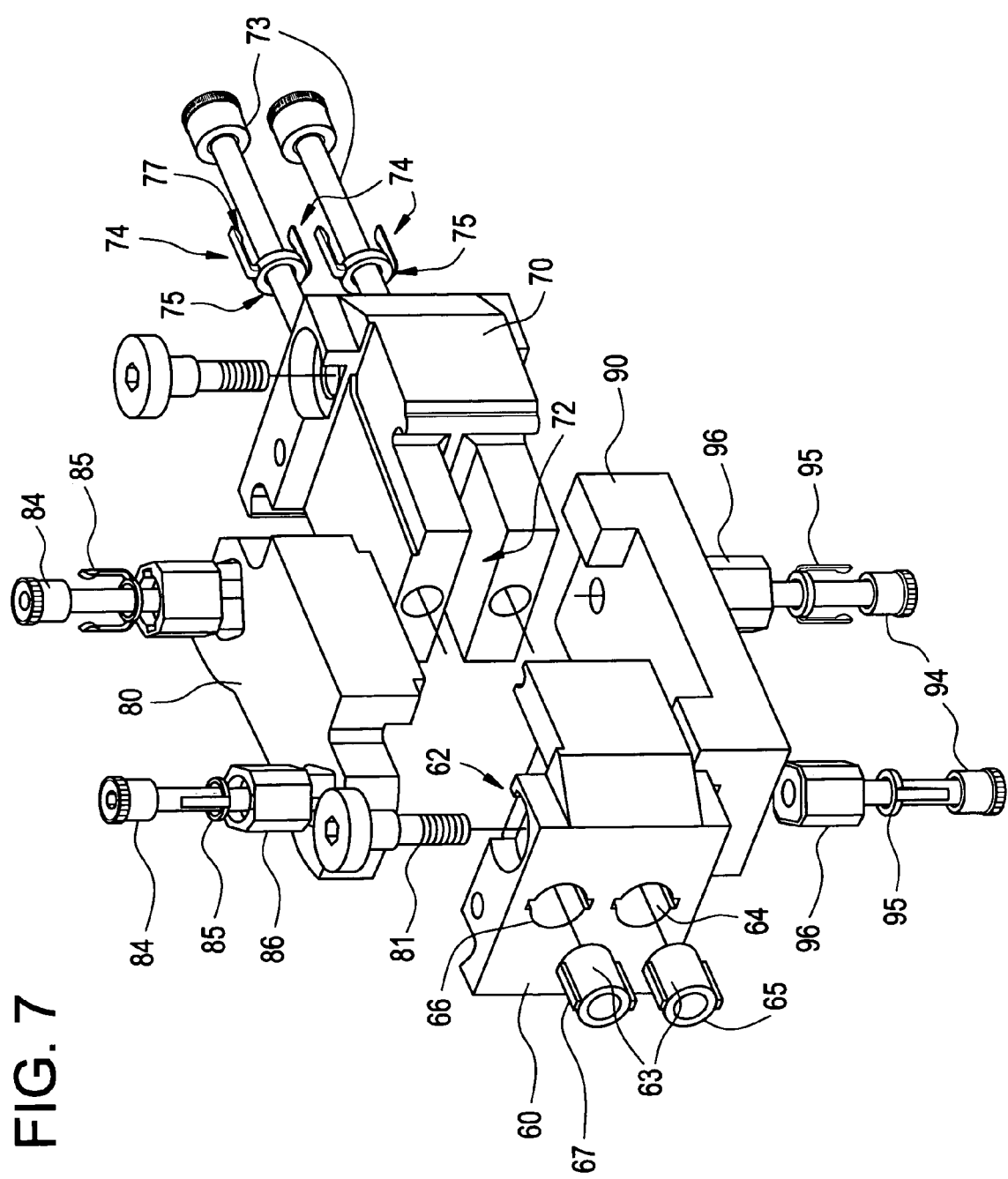
FIG. 7 is an exploded view of the clamp apparatus in accordance with an exemplary embodiment of the present invention.

FIG. 7 is an exploded view of the clamp apparatus in accordance with an exemplary embodiment of the present invention. FIG. 7 more clearly illustrates the primary structural components of the clamp assembly 50: outboard clamp component 60, inboard clamp component 70, primary bearing plate 80 and secondary bearing plate 90. These clamp apparatus 50 components may be adapted to evenly distribute stress on surfaces of the riser brace assembly, and may be fixedly secured to the riser brace assembly 50 with mechanical fasteners adapted to provide clamping forces. The clamp apparatus 50 components with mechanical fasteners (i.e., associated bolts, nuts, and locking devices) are shown in the exploded view of FIG. 7.

The outboard clamp component 60 and inboard clamp component 70 interface with the reactor vessel pad 130 at the location of the half-dovetails 150, which have been machined into the reactor vessel pad 130. The outboard and inboard clamp components 60, 70 interface together by virtue of two features, a 'hinge' feature and a 'central extension and slot' feature.

Figure 9:
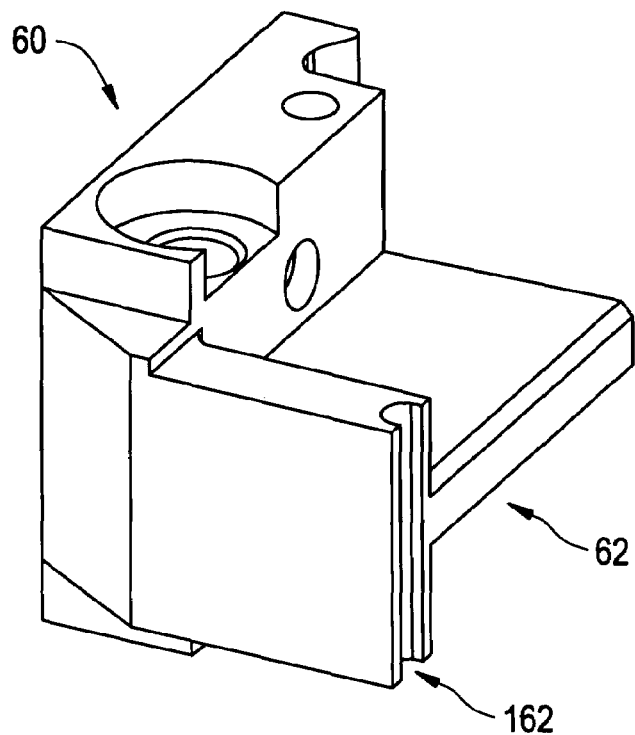
FIG. 9 is an enlarged view illustrating an outboard clamp of the clamp apparatus, in accordance with an exemplary embodiment of the present invention.
Figure 10:
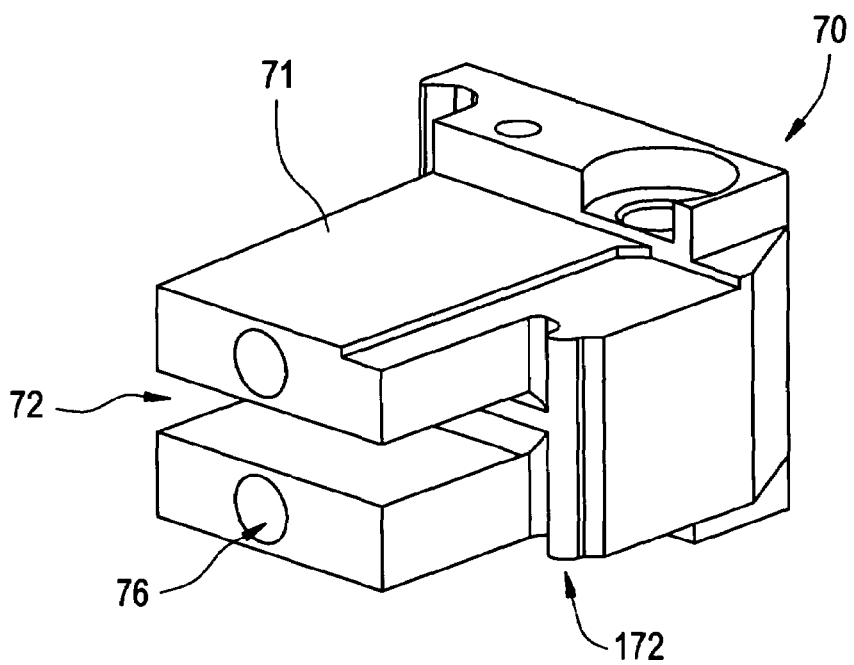
FIG. 10 is an enlarged view illustrating an inboard clamp of the clamp apparatus, in accordance with an exemplary embodiment of the present invention.

FIG. 9 is an enlarged view illustrating an outboard clamp of the clamp apparatus; and FIG. 10 is an enlarged view illustrating an inboard clamp of the clamp apparatus, in accordance with an exemplary embodiment of the present invention. As shown clearly in FIGS. 9 and 10, and with reference to FIG. 7, a central extension portion 62 of the outboard clamp component 60 slides into a slot portion 72 of the inboard clamp component 70. The central extension portion 62 and slot portion 72 features ensure that the outboard and inboard clamp components 60, 70 are oriented properly with respect to each other so as to provide the proper alignment necessary for clamp bolts 73, clamp bolt keepers 74 and clamp bolt nuts 63. Accordingly, engagement of the central extension and slot portions 62 and 72 permits a degree or articulation between the first and second clamp components so as to provide a hinge point for first and second clamp component movement.

Movement (and alignment) may be further facilitated by a hinge relationship between clamp components 60 and 70. As shown in FIGS. 9 and 10, inboard clamp component 70 includes a cylindrical male hinge feature 172 which may engage to a cylindrical female hinge feature 162 of outboard clamp component 60.

As shown best in FIG. 10, counter-bored holes 76 in the inboard clamp component 70 receive the clamp bolts 73 and clamp bolt keepers 74. Counter-bored holes 64 (FIG. 7) in the outboard clamp component 60 likewise receive the clamp bolt nuts 63.

Figure 11A:
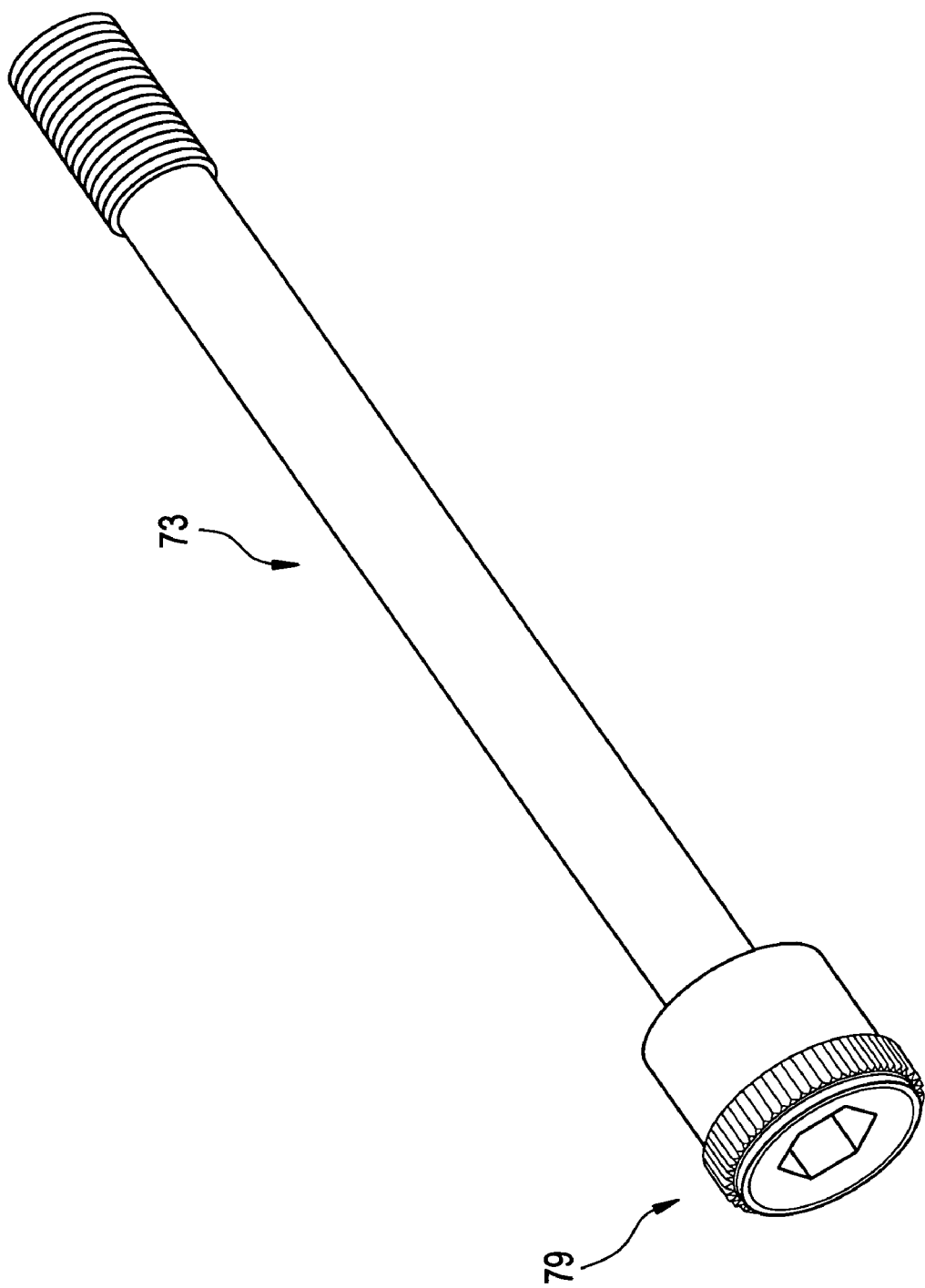
FIGS. 11A and 11B are enlarged views of a clamp bolt and clamp bolt keeper of the clamp apparatus, in accordance with an exemplary embodiment of the present invention.
Figure 11B:
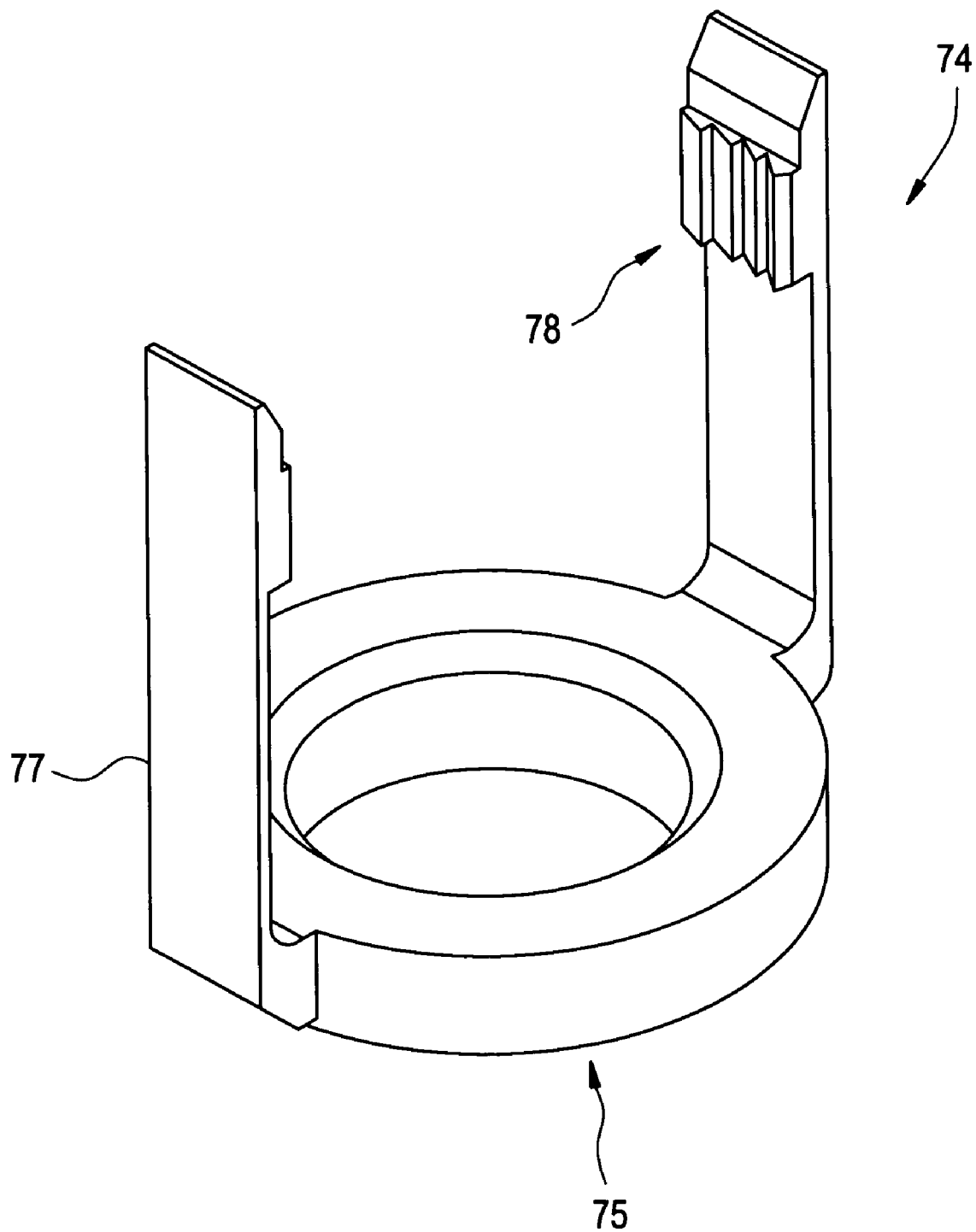

FIGS. 11A and 11B are enlarged views of a clamp bolt and clamp bolt keeper of the clamp apparatus, in accordance with an exemplary embodiment of the present invention. As shown best in FIG. 11B, mating surfaces 75 of the clamp bolt keeper 74 and inboard clamp component 70 may be spherical and the mating surfaces 65 of the clamp bolt nut 63 and outboard clamp 60 (see FIG. 7) may also be generally spherical. These spherical bearing surfaces 65 and 75 may be present at both ends (i.e., nuts 63 and keepers 74) in the vicinity of the clamp bolts 73 so as to allow a small degree of articulation between the outboard and inboard clamp components 60, 70. The use of spherical surfaces 65, 75 thus allows articulation to alleviate bending stresses in the clamp bolts 73. As a mechanical preload is applied through the clamp bolts 73, a clamping force may be generated at the interface of the reactor vessel pad half-dovetails 150 and the outboard and inboard clamp components 60, 70 as the clamp components 60, 70 pivot about their 'hinge' point at features 162, 172.

Associated with the counter-bored features in the outboard and inboard clamp components are 'keyways' shown generally at 66 in FIG. 7 which receive 'keyed' features 67 (for clamp bolt nuts 63), and keyed features 77 of the clamp bolt keepers 74. As shown in FIG. 11B, these features 67, 77 may inhibit relative rotation of the clamp bolt nuts 63 and clamp bolt keepers 74 with the outboard clamp component 60 and inboard clamp component 70, respectively. To prevent loosening of the clamp bolts 73, 'ratchet teeth' 78 of the clamp bolt keepers 74 interface with 'teeth' 79 of the clamp bolts 73.

Additionally, the top surface 71 (FIG. 10) of the inboard clamp component 70 may be machined so that the contact area with the lower (underside) surface of the riser brace leaf 41a (or 41b) is exactly opposite with the area of contact of the primary bearing plate 80 with the upper surface of the riser brace leaf 41a, 41b. This may be seen for example in FIGS. 3 or 5. This is important since the riser brace leaf 41a, 41b is typically subject to flow-induced vibration from the reactor water recirculation system, for example.

Once the inboard and outboard clamp components 60, 70 are properly oriented in relation to the reactor vessel pad 130 and riser brace leaf 41/42, and a desired mechanical preload has been applied to the clamp bolts 73, features of the clamp components 60, 70 may be utilized to 'match machine' the crescent shaped features 170 in the upper surface of the riser brace leaf 41a, 41b. The brace bolts 81 may then be added to the clamp assembly 50 with the desired mechanical preload applied.

Field measurements may then be ascertained and the primary and secondary bearing plates 80, 90 machined accordingly. Measurements may be taken from the horizontal surfaces 160 of the reactor vessel pad 130 to the top surface of the riser brace leaf 41a, 41b and the top surface of the brace bolts 81. The primary bearing plate 80 is then machined such that when installed, it will be configured horizontally in the same plane as the upper horizontal bearing surfaces of the reactor vessel pads 130 and bear on the top surface of the riser brace leaf 41a, for example, as shown in FIG. 5. Additionally, small equal-distance gaps 180 may be provided between the primary bearing plate 80 and the top surface of the brace bolts 81, as shown in FIG. 5. These gaps 180 may ensure that the primary bearing plate 80 maintains positive contact with the riser brace leaf 41a. In similar fashion, the secondary bearing plate 90 may be machined such that when installed, it will be configured horizontally in the same plane as the lower horizontal bearing surfaces of the reactor vessel pads 130 and bear on the bottom surface of the inboard and outboard clamp components 60, 70.

Figure 12A:
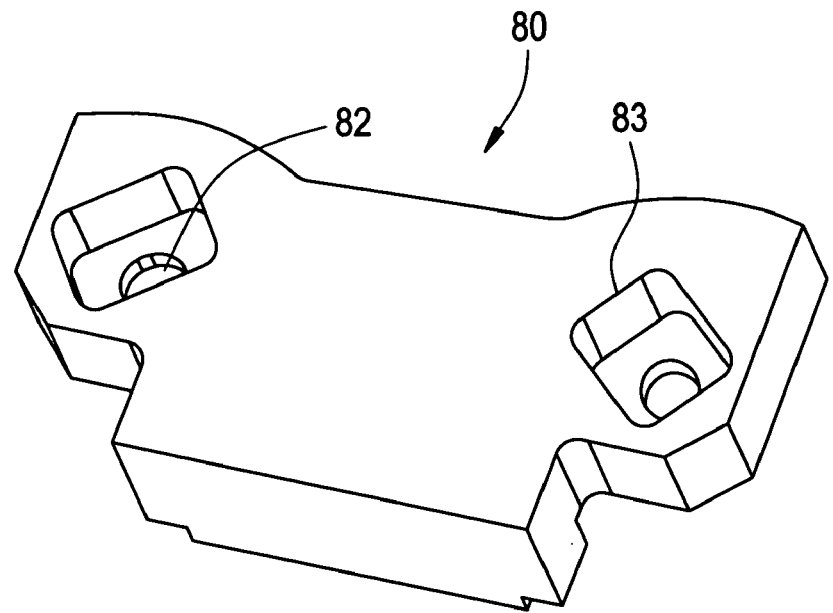
FIG. 12A is an enlarged view of a primary bearing plate and FIG. 12B an enlarged view of a secondary bearing plate of the exemplary clamp apparatus.
Figure 12B:
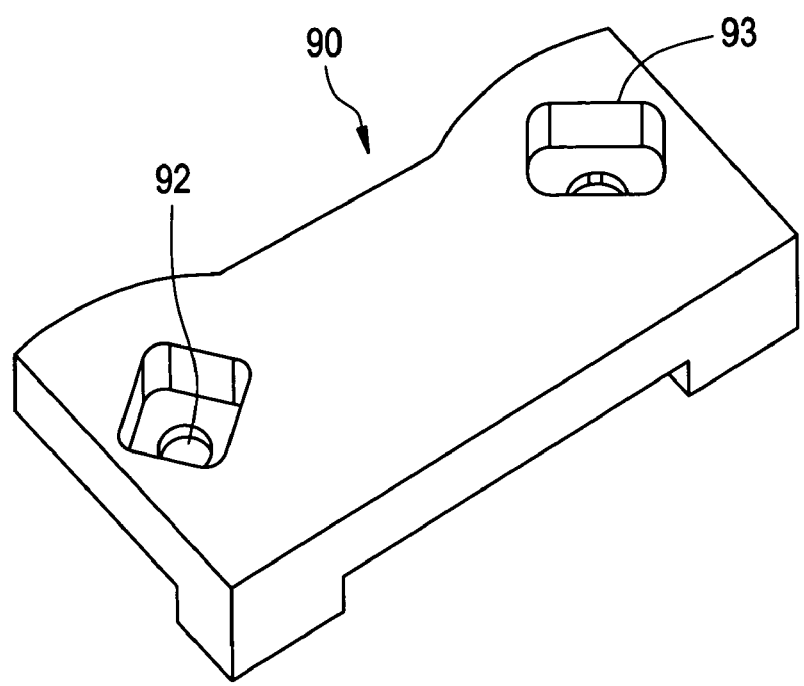

FIG. 12A is an enlarged view of a primary bearing plate and FIG. 12B an enlarged view of a secondary bearing plate of the exemplary clamp apparatus. As shown in FIGS. 12A and 12B, both of primary and secondary 90 bearing plates 80, 90 may be provided with slotted holes 82, 92 and generally rectangular-shaped cavities 83, 93. These features 82, 83, 92, 93 may allow movement of bearing plate bolts 84, 94, bearing plate bolt keepers 85, 95 and bearing plate inserts 86, 96 (see FIG. 7) relative to the respective primary and secondary bearing plates 80, 90.

The half-dovetails 150 machined into the reactor vessel pads 130 have associated machining tolerances. As a result, as the clamp bolts 73 are mechanically preloaded, the inboard and outboard clamp components 60, 70 may rotate slightly about their 'hinge' point. As such, a provision is made to allow the bearing plate bolts 84, 94 to move consistent with the movement of the inboard and outboard clamps 60, 70.

Figure 13:
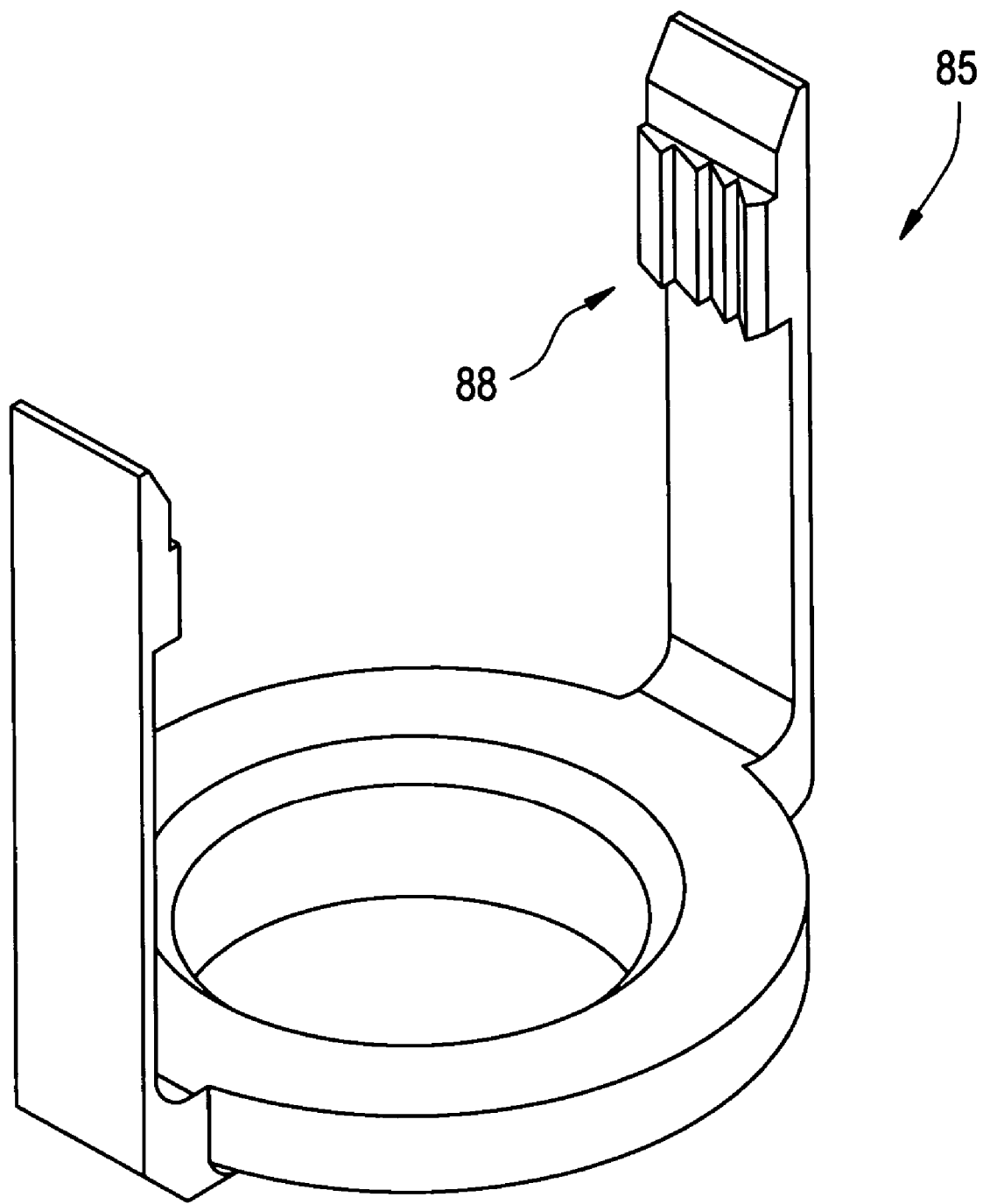
FIG. 13 is an enlarged view of a bearing plate bolt keeper of the exemplary clamp apparatus.
Figure 14:
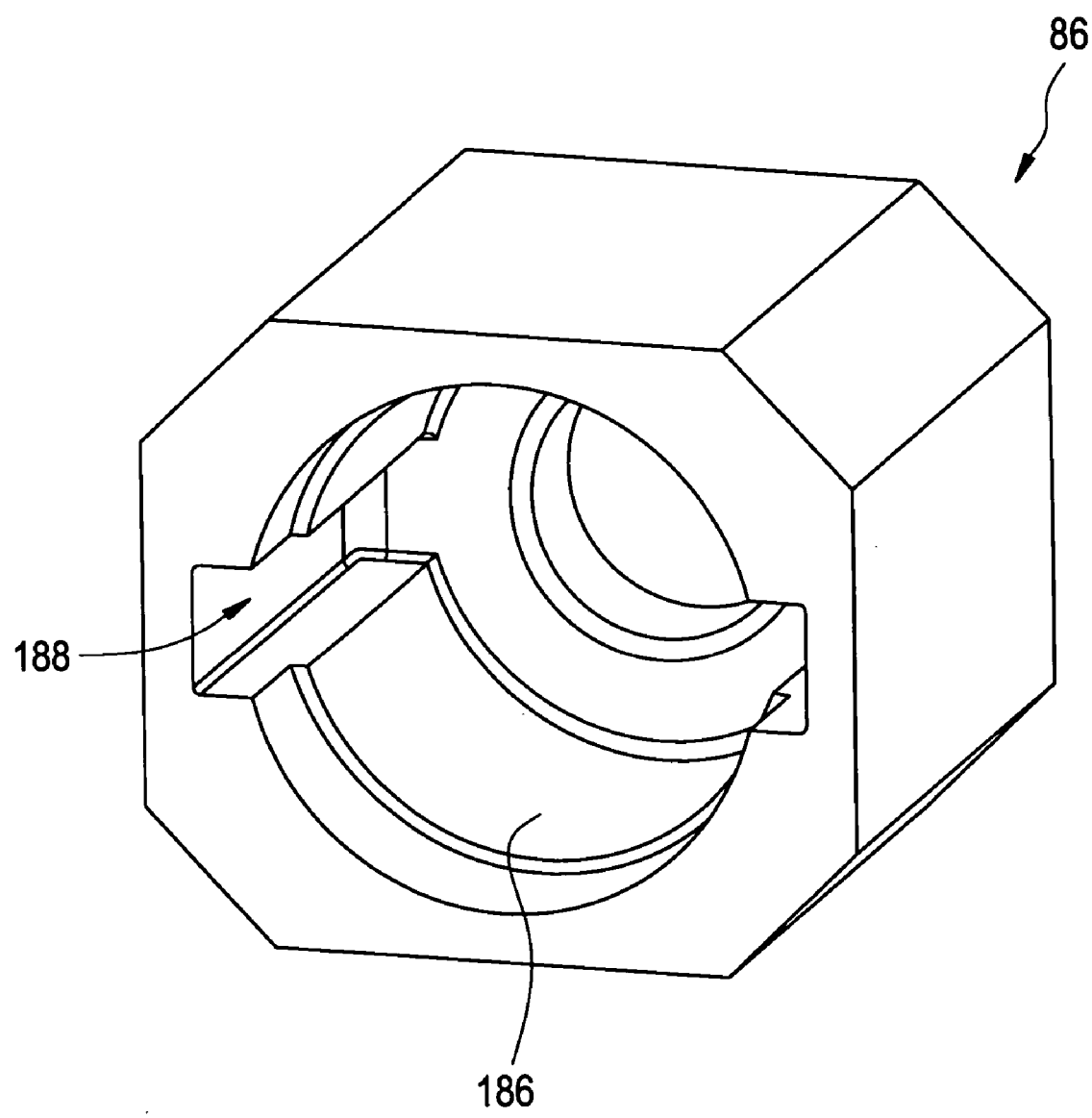
FIG. 14 is an enlarged view of a bearing plate insert of the exemplary clamp apparatus.

FIG. 13 is an enlarged view of a bearing plate bolt keeper of the exemplary clamp apparatus; FIG. 14 is an enlarged view of a bearing plate insert of the exemplary clamp apparatus. FIG. 13 shows an exemplary bearing plate bolt keeper 85, it being understood that bearing plate bolt keeper 95 may be of the same construction. Similarly, FIG. 14 shows an exemplary bearing plate insert 86, it being understood that bearing plate insert 96 may be of the same construction. Occasional reference should also be made to FIG. 7.

Referring to FIGS. 13 and 14, each of the bearing plate inserts 86, 96 include a counter-bored hole 186 and a keyway 188 to receive the bearing plate keepers 85, 95 and bearing plate bolts 84, 94. The ratchet teeth 88, 98 (not shown) of the bearing plate keepers 85, 95 engage the teeth of the bearing plate bolts 84, 94 in order to prevent loss of mechanical preload in the bearing plate bolts 84, 94.

Figure 8:
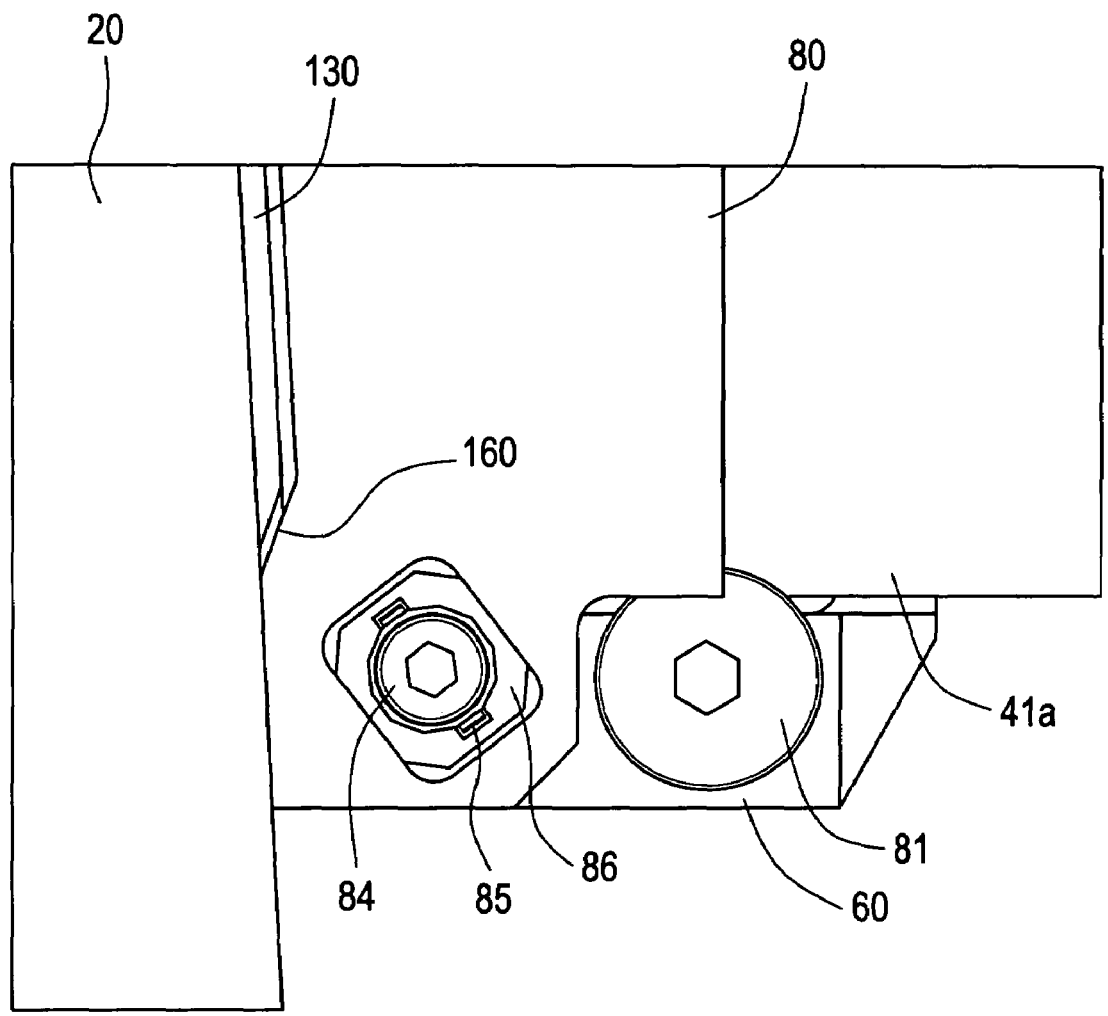
FIG. 8 is an enlarged, sectional top-view of the clamp apparatus in place between the reactor vessel riser brace pad and riser brace leaves.

FIG. 8 is an enlarged, sectional top-view of the clamp apparatus in place between the reactor vessel riser brace pad and riser brace leaves. The orientation of the short bearing plate bolt 84, bearing plate keeper 85, bearing plate insert 86, and primary bearing plate 80 may be more clearly shown in FIG. 8.

The exemplary clamp assembly 50 may structurally replace any of the 'RB-1' welds 143-146 connecting a given riser brace leaf 41a-b/42a-b and the associated reactor vessel pad 130. Unlike conventional riser brace clamps, the clamp assembly 50 does not lend structural support to the adjacent riser brace leaf weld 143-146, but is designed to structurally replace a given weld 143-146. Since the clamp assembly 50 is designed to structurally replace the attachment weld 143-146, it is not necessary that the existing weld 143-146 be accessible for visual inspection after the clamp assembly 50 has been installed. However, since the clamp assembly 50 may obscure the adjacent riser brace leaf weld 143-146, the clamp assembly 50 is designed to be removed for subsequent inspection of both degraded and adjacent riser brace leaf welds 143-146.

Therefore, the installed clamp apparatus 50 structurally replaces a weld attaching upper riser brace leaf 41 and/or lower riser brace leaf 42 to reactor vessel pad 130. The riser brace assembly 40 is designed to accommodate the differential thermal expansion that results from reactor start-up and heat-up, and to accommodate the flow-induced vibration that is incumbent in the reactor water recirculation system (not shown) due to reactor recirculation pumps.

The exemplary embodiments of the present invention being thus described, it will be obvious that the same may be varied in many ways. Such variations are not to be regarded as departure from the spirit and scope of the exemplary embodiments of the present invention, and all such modifications as would be obvious to one skilled in the art are intended to be included within the scope of the following claims.

What is claimed:

1. A clamp apparatus for repairing a riser brace assembly in a nuclear reactor, the riser brace assembly having an upper riser brace leaf and a lower brace leaf connected to a reactor pressure vessel pad on a wall of the nuclear reactor, comprising:

a first clamp component including a central extension portion, a second clamp component including a slot portion, the extension portion engageable with the slot portion to provide alignment between the first and second clamp components, the first and second clamp components to be located between the upper riser brace leaf and the lower riser brace leaf of the riser brace assembly, a first plate connected to the first and second clamp components and configured to bear on an upper surface of the first clamp component, an upper surface of the second clamp component and a top surface of the upper riser brace leaf while the clamp apparatus is in use, and a second plate connected to the first and second clamp components so as to bear on an underside surface of the first and second clamp components wherein the first clamp component and the second clamp component include opposing recessed channels configured to grip the sides of the reactor pressure vessel pad.

2. The clamp apparatus of claim 1, wherein the first clamp has either a male or a female hinge part, and the second clamp has a mating male or female hinge part that mates with the first clamp hinge part, the first clamp and second clamp hinge parts mating to form a hinge configured to permit a degree of articulation and movement between the first and second clamp components.

3. The clamp apparatus of claim 1, wherein the first and second clamp components are configured to fixedly secured to only one of the upper and lower riser brace leaves while the clamp apparatus is in use.

4. The clamp apparatus of claim 1, further comprising:
one or more brace bolts for fixedly connecting the first and second clamp components to the upper and lower riser brace leaves.

5. The clamp apparatus of claim 4, wherein the reactor vessel pad is substantially square or rectangular and includes a plurality of horizontal bearing surfaces machined therein at corners thereof, and further comprising:
side surfaces of the first and second components and the bottom surface of the first plate are configured to define a plurality of equal-distance gaps, such that the first plate is configured to maintain positive contact with the upper riser brace leaf, while the clamp apparatus is in use, as opposed to being obstructed by the side surfaces of the first and second components.

6. The clamp apparatus of claim 5, wherein
the second plate is configured to bear on underside surfaces of the first and second clamp components so as to maintain positive contact with the underside surfaces, and
the second plate is configured such that the second plate is not in direct contact with either of the upper and lower riser brace leaves, while the clamp apparatus is in use.

7. The clamp apparatus of claim 1, wherein a top surface of the second clamp component is machined so that a contact area with an underside surface of the upper riser brace leaf is opposed to an area of contact of the first plate with a top surface of the upper riser brace leaf, while the clamp apparatus is in use.

8. The clamp apparatus of claim 1, wherein the first and second clamp components and first and second plates are configured such that the first and second clamp components fixedly secure to the riser brace assembly with mechanical fasteners configured to provide clamping forces, while the clamp apparatus is in use.

9. The clamp apparatus of claim 8, wherein
the mechanical fasteners include one or more clamp bolts, clamp bolt keepers having a keyed feature thereon and clamp bolt nuts having a keyed feature thereon,
each of the first and second clamp components include a bore with keyways therein, a given keyway within a corresponding bore receiving one of the keyed features of a given clamp bolt feature and clamp bolt nut therein, and
the keyed features inhibit relative rotation of the clamp bolt keepers and clamp bolt nuts with one or both of the first and second clamp components.

10. The clamp apparatus of claim 9, wherein
each clamp bolt and clamp bolt keeper includes teeth thereon so that the teeth of a given clamp bolt keepers engage teeth of a given corresponding clamp bolt to prevent loss of mechanical preload in the clamp bolt.

11. The clamp apparatus of claim 7, wherein the mechanical fasteners include one or more clamp bolts, and mechanical fasteners for the first and second clamp components include generally spherical bearing surfaces to permit a degree of articulation between the first and second clamp components to alleviate bending stresses on the clamp bolts.

12. The clamp apparatus of claim 11, wherein the recessed channels allow a mechanical preload to be applied by tightening the clamp bolts, the clamp components configured to provide a clamping force as they pivot about a hinge point formed at the engagement of the extension and slot portions.

13. The clamp apparatus of claim 8, wherein the first and second plates include corresponding slotted holes within generally rectangular-shaped cavities, the mechanical fasteners for the first and second plates include one or more bearing plate bolts with corresponding bearing plate bolt keepers and bearing plate inserts, and the corresponding slotted holes within cavities configured to permit movement of corresponding bearing plate bolts, bearing plate bolt keepers and bearing plate inserts relative to the respective first and second plates.

14. The clamp apparatus of claim 13, wherein each bearing plate bolt and bearing plate bolt keeper includes teeth thereon, and each of the bearing plate inserts include a counter-bored hole and a keyway to receive corresponding bearing plate keepers and bearing plate bolts, so that the teeth of a given bearing plate keepers engage teeth of a given corresponding bearing plate bolt to prevent loss of mechanical preload in the bearing plate bolts.

\* \* \* \* \*